United States Patent
Nusser et al.

(10) Patent No.: US 11,006,591 B2
(45) Date of Patent: May 18, 2021

(54) DURABLE AND MODULAR SELF-WATERING SYSTEM FOR GROWING PLANTS

(71) Applicant: Avalow, Inc., Santa Rosa, CA (US)

(72) Inventors: Jeremy Nusser, Healdsburg, CA (US); Andrew Picciau, Jr., Windsor, CA (US)

(73) Assignee: Avalow, Inc., Santa Rosa, CA (US)

( * ) Notice: Subject to any disclaimer, the term of this patent is extended or adjusted under 35 U.S.C. 154(b) by 144 days.

(21) Appl. No.: 16/365,384

(22) Filed: Mar. 26, 2019

(65) Prior Publication Data

US 2019/0297802 A1 Oct. 3, 2019

Related U.S. Application Data

(60) Provisional application No. 62/649,574, filed on Mar. 29, 2018.

(51) Int. Cl.
*A01G 27/06* (2006.01)
*A01G 27/00* (2006.01)

(52) U.S. Cl.
CPC .......... *A01G 27/06* (2013.01); *A01G 27/008* (2013.01)

(58) Field of Classification Search
CPC .... A01G 27/06; A01G 27/008; A01G 27/005; A01G 27/04
See application file for complete search history.

(56) References Cited

U.S. PATENT DOCUMENTS

| | | | | |
|---|---|---|---|---|
| 2,344,202 A | * | 3/1944 | Carlson | A01G 27/04 47/80 |
| 3,193,970 A | * | 7/1965 | Green | A01G 27/06 47/80 |
| 3,220,144 A | * | 11/1965 | Green | A01G 27/06 47/80 |
| 4,231,187 A | * | 11/1980 | Greenbaum | A01G 27/04 47/39 |
| 4,908,986 A | * | 3/1990 | Rowland | A01G 27/04 47/64 |
| 5,189,835 A | | 3/1993 | Green | |

(Continued)

FOREIGN PATENT DOCUMENTS

| | | |
|---|---|---|
| CA | 2292302 A1 | 6/2000 |
| CN | 102124914 A | 7/2011 |
| CN | 205755882 U | 12/2016 |

OTHER PUBLICATIONS

International Search Report and Written Opinion for International Application No. PCT/US2019/024638, dated Jun. 21, 2019, 10 pages.

*Primary Examiner* — Magdalena Topolski
*Assistant Examiner* — Katelyn T Truong
(74) *Attorney, Agent, or Firm* — Lowenstein Sandler LLP

(57) ABSTRACT

A self-watering system includes a base comprising a reservoir configured to store a defined volume of water and a plurality of wick modules coupled to the base, the plurality of wick modules arranged in an organized pattern and configured to disperse the water from the reservoir. The self-watering system further includes a removable fill tube coupled to the base and configured to receive the water to fill the reservoir, and a removable drain tube coupled to the base and configured to remove the water from the reservoir.

8 Claims, 3 Drawing Sheets

(56) References Cited

U.S. PATENT DOCUMENTS

| | | | |
|---|---|---|---|
| 5,644,868 A * | 7/1997 | Lui | A01G 27/06 47/79 |
| 6,367,197 B1 | 4/2002 | Saye | |
| 6,389,751 B1 | 5/2002 | Wang | |
| 7,730,666 B2 | 6/2010 | Spray | |
| 8,011,135 B2 | 9/2011 | Masser et al. | |
| 8,528,252 B2 | 9/2013 | Griebel | |
| 9,392,756 B1 | 7/2016 | Conrad, Jr. | |
| 9,439,370 B2 | 9/2016 | Donnelly et al. | |
| 9,516,821 B1 | 12/2016 | Conrad, Jr. | |
| 9,578,818 B2 | 2/2017 | Hooper et al. | |
| 9,867,340 B1 | 1/2018 | Conrad, Jr. | |
| 2005/0252080 A1* | 11/2005 | Wright | A01G 27/04 47/79 |
| 2011/0154734 A1 | 6/2011 | Eichenauer | |
| 2015/0033625 A1 | 2/2015 | Jawarski et al. | |
| 2015/0181813 A1 | 7/2015 | van Raam et al. | |
| 2015/0289461 A1* | 10/2015 | Liu | A01G 27/06 47/79 |
| 2016/0081283 A1* | 3/2016 | Pierce | A01G 27/005 47/80 |
| 2017/0245442 A1 | 8/2017 | Stewart | |

\* cited by examiner

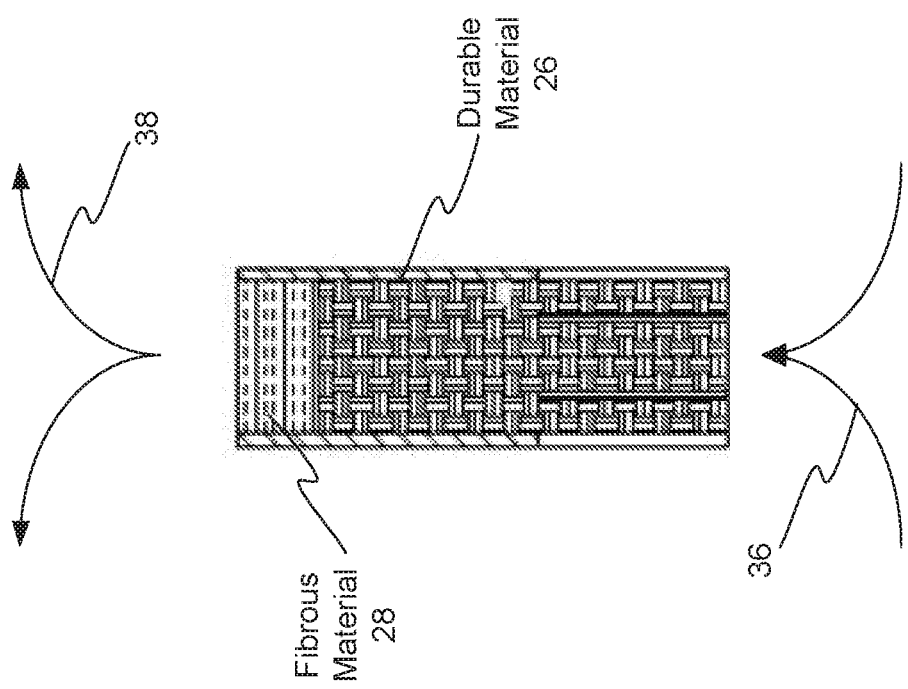
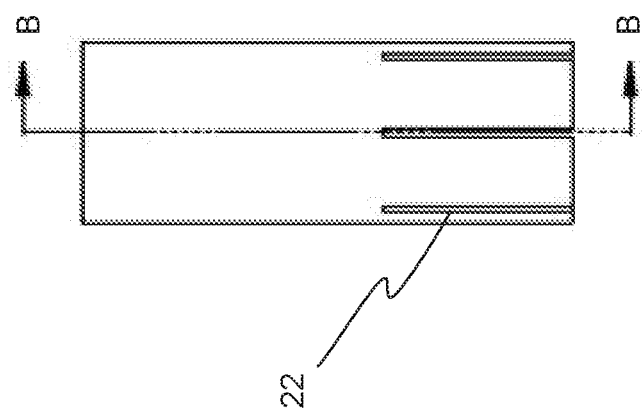
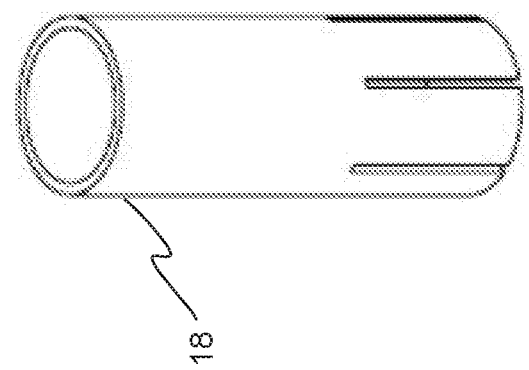

DURABLE AND MODULAR SELF-WATERING SYSTEM FOR GROWING PLANTS

RELATED APPLICATIONS

This application claims the benefit of U.S. Provisional Patent Application No. 62/649,574, filed on Mar. 29, 2018, the entire contents of which are hereby incorporated by reference herein.

TECHNICAL FIELD

The present disclosure relates to the field of plant irrigation, and more particularly, to a self-watering plant apparatus with an integral water reservoir, a series of wicking modules, and removable fill and drain fittings in order to provide plants a constant water source and delivery mechanism.

BACKGROUND

Self-watering systems have a long history of application, from commercial agriculture to tree care and indoor plants. A number of different designs have been developed over the years to assure a plant receives a continuous supply of water, while attempting to increase the period between watering.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

FIG. 3A illustrates an isometric view of a wick module, according to an embodiment of the present disclosure.

FIG. 3B illustrates a side view of the wick module, according to an embodiment of the present disclosure.

FIG. 3C illustrates a section view of the wick module, along plane B-B, as shown in FIG. 3B, according to an embodiment of the present disclosure.

DETAILED DESCRIPTION

Figure 1:
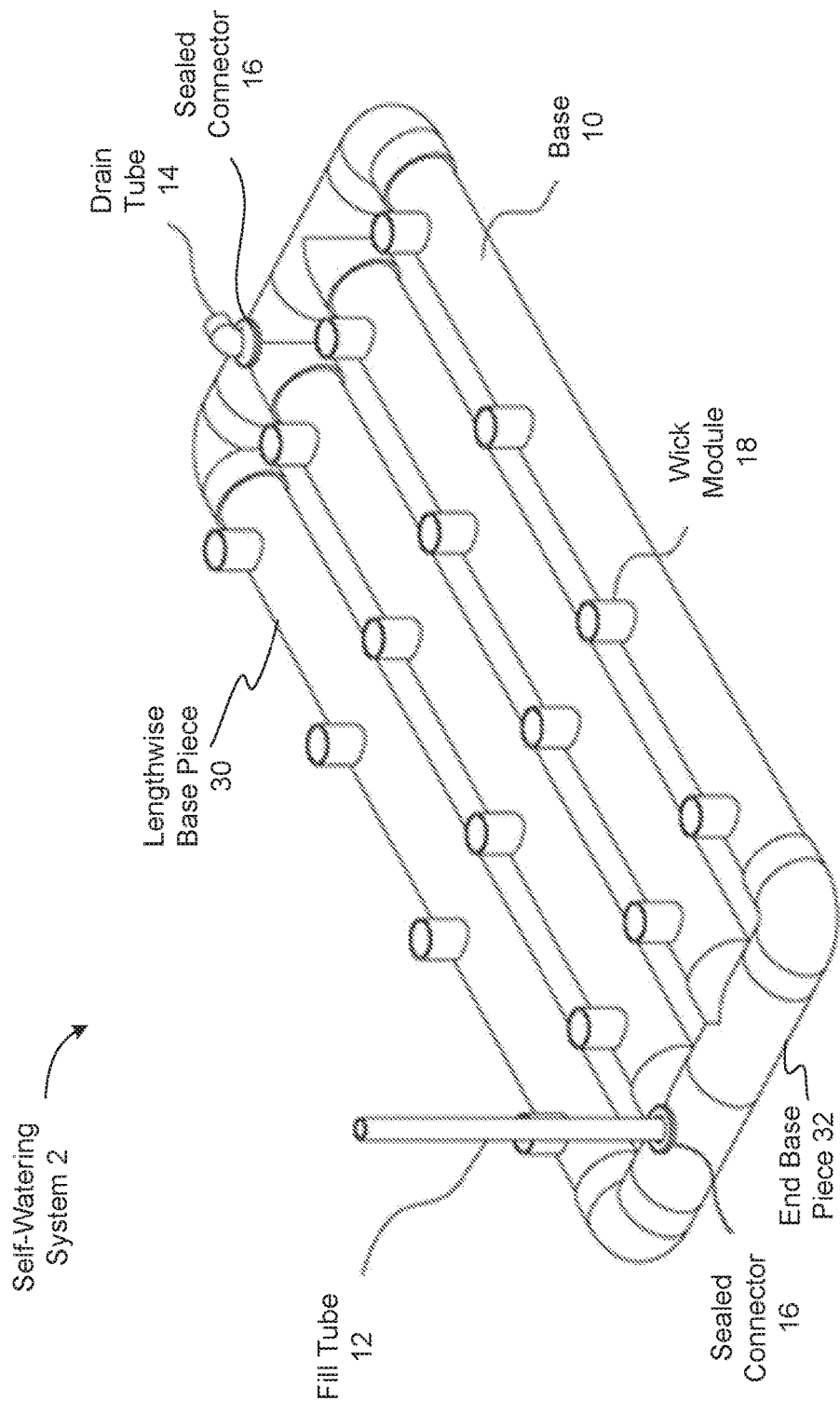
FIG. 1 illustrates an isometric view of a modular self-watering system, according to an embodiment of the present disclosure.

Embodiments are described for a self-watering plant apparatus and system with an integral water reservoir, a series of wick modules, and removable fill and drain fittings. In order to provide a continuous supply of water to the soil in a pot or planter, as well as any plants growing therein, many watering systems include a built-in reservoir for storing water and a mechanism for supplying a constant flow of water from the reservoir. Many conventional systems utilize external reservoirs which can take up significant space and may be visually unappealing in certain settings. In addition, when buried under the soil in the pot or planter, the opening through which water is added to the water reservoir must remain accessible, and thus be located at or above ground level. This limits the depth to which conventional watering systems can be buried in the soil. Furthermore, while certain conventional systems continuously supply water to a plant on a regular basis, none provide a separate, modular reservoir which can be used with a wide variety of standard planter bed sizes found in typical home gardens. Nor do the conventional systems provide a watering system that maximizes plant performance while requiring lower overall maintenance.

Hydroponic growing methodologies have led to advancements in materials used to keep plants adequately hydrated with less water losses. Developments in this area include the use of natural materials such as coconut husk, clay and various types of rock to allow optimal root growth while resisting rot or degradation. Typical self-watering planters use a standard water reservoir in combination with wicks formed from a single man-made material (e.g., polyester fibers or similar materials) that facilitate water transfer from the reservoir to the soil or root system. This design requires frequent maintenance of the wicks and limits the performance and consumer value of the self-watering feature.

Most existing self-watering planters are not available in sizes commonly used in outdoor home gardening. Home gardens most commonly use either drip irrigation systems or hand watering. Both techniques require constant monitoring and diligence for successful growing. Drip systems have multiple points of potential failure and commonly require significant effort to operate as intended, while hand-watering requires multiple visits per day and uses 20-30% more water than drip systems due to evaporative losses.

Aspects of the present disclosure address the above and other deficiencies by implementing a self-watering plant apparatus and system with an integral water reservoir, a series of wicking chambers, and removable fill and drain fittings. Embodiments of the system described herein include a sub-irrigation apparatus for the self-watering of raised bed gardens. The system base, which includes the water reservoir, includes built-in wick modules arranged in a designated pattern and extending upwards to allow for dispersion of the water from the reservoir. Each wick module includes a wick that utilizes natural materials for extended maintenance-free operation. The reservoir is also fitted with removable fittings for fill and drainage in order to improve the ease of shipping and installation.

Each wick module includes a pattern of openings to allow water to move through them (i.e., up from the reservoir through the openings into the wick material and out into the surrounding soil) and are also sized to the reservoir to allow water to flow around them without creation of air pockets that limit effective use of reservoir space. In one embodiment, the reservoir is designed with a ratio of approximately 0.5 to 1.5 gallons of reservoir capacity for every 1 square foot of garden (i.e., the surface area of the top of the soil in the planter box). This ratio allows a consumer-friendly length of time to pass between reservoir refills during peak growing seasons.

Depending on the embodiment, the materials used in the wicks include both a durable hard solution as a base layer, such as various types of rock, expanded clay pebbles, igneous volcanic material, crushed granite, or similar material, as well as a fibrous material used as the top layer above the hard solution that acts as the primary wicking material to maximize absorption and transmission of water. The fibrous material may include, for example, coco coir, sphagnum moss, or other such fibrous materials that may be expected to last and perform maintenance-free for a number of years (e.g., 3 years or more). In one embodiment, the wick modules include a housing that is fixed in place and open on the top to allow for easy replacement and cleaning of the wick materials to continue usage at maximum efficiency over time.

In one embodiment, the system base and reservoir is made from durable materials in order to withstand both the weight of the soil in the planter box as well as operating temperatures that can be expected with outdoor growing. The reservoir can be modular in size, length, width, and capacity and can be designed to fit a variety of full-sized raised bed planters. The number and arrangement of wick modules can also be configured based on the specific implementation. In one embodiment, the size of the reservoir is specified so that a home gardener will most likely not need to add water more than once per week under normal seasonal plant requirements. The reservoir may be manufactured with leak-free connections and food-safe, durable materials in a modular system that allows for distribution through shipping and a standardized installation experiences for consumers.

The self-watering system disclosed herein allows for below surface irrigation that provides additional benefits for food production. Due to the nature of the self-watering system where water is dispersed from the bottom of the planter box, the top layer of soil (e.g., ¼" inch to 1") often becomes dry. This limits germination of unwanted plants (i.e., weeds) and greatly reduces bacterial or fungal plant infections along with the amount of pests who prefer moist environments. Given the variables involved with weather, temperature, humidity, wind and solar intensity and the complications of conventional irrigation systems, many gardeners apply too much or too little water. As a result, over 70% of garden issues are caused by either over-irrigation or under-irrigation of plants. The present self-watering system allows the plants to use capillary pressure differentials to water themselves adequately thereby dramatically reducing the amount of effort required, while increasing the success rate of home gardeners.

FIG. 1 illustrates an isometric view of a modular self-watering system 2, according to an embodiment of the present disclosure. The self-watering system 2 includes a base 10 that functions as a water reservoir, with the base 10 having a number of attached wick module 18. In one embodiment, the base 10 is constructed of durable materials that can safely hold water while withstanding being buried underground for long periods of time. A fill tube 12 used to add water to the reservoir and a drain tube 14 used to remove water from the reservoir are both attached to the base 10. In one embodiment, the fill tube 12 and the drain tube 14 are capable of being easily attached to the base 10 using a sealed connector 16. In one embodiment, the reservoir in base 10 is sized for home gardeners to fill once per week under maximum plant load, typically during the summer months, and less often during the cooler and wetter seasons. In one embodiment, the drain tube 14 is set to define an overflow height for the reservoir. For example, the drain tube 14, may be positioned at a height approximately one inch below the tops of the wick modules 18. The drain tube 14, thus sets the maximum full height of the reservoir to prevent damage to the internal wicking elements of wick modules 18. Once the water level in the reservoir reaches the overflow height, the drain tube 14 allows any additional water added to the reservoir via full tube 12 to flow directly out of the drain tube 14 instead of overloading the reservoir and wick modules 18.

In one embodiment the base 10 is formed from a number of lengthwise base pieces 30, arranged substantially parallel to each other, and a number of end base pieces 32. In one embodiment, each of the end base pieces 32 intersect each of the lengthwise base pieces 30. In the embodiment illustrated in FIG. 1, the base 10 includes four lengthwise base pieces 30 and two end base pieces 32. In other embodiments, some other number of lengthwise base pieces 30 and/or end base pieces 32 are possible. In one embodiment, each of lengthwise base pieces 30 and end base pieces 32 are formed from substantially straight and hollow tubular pipes approximately four inches to eight inches in diameter. Lengthwise base pieces 30, end base pieces 32, fill tube 12, drain tube 14, as well as the solid housing of wick modules 18, may be formed from polyvinyl chloride (PVC) irrigation pipe rated for water usage (e.g., SDR 35 rated for rainwater harvesting and surface drainage). In other embodiments, the lengthwise base pieces 30 and/or end base pieces 32 may have some other shape, design, or orientation. In one embodiment, all of lengthwise base pieces 30 and end base pieces 32 are connected together forming a single contiguous reservoir for storing water. In other embodiments, there may be two or more separate reservoirs formed using any combination of lengthwise base pieces 30 and end base pieces 32. Depending on the embodiment, the other materials used in self-watering system 2 may include, for example, PVC1120 Type1 Grade1, Cell Class 12454 pipe fittings, according to the ASTM D1784 Specification for Rigid PVC Compounds, and the ASTM D3034 Specification for PVC Sewer Pipe In one embodiment, the fill tube 12 is positioned opposite the drain tube 14. The fill tube 12 may be sized to have a certain length dependent on the depth of the base 10 relative to the height of any soil covering the base 10 within a planter box in which the self-watering system 2 is installed. The length of the fill tube 10 may result in a first end being at a level of the top of the soil, or above the top of the soil, while a second end of the fill tube is attached to the base 10 using the sealed connector 16. In one embodiment, the first end of the fill tube 12 is sized to accept a common garden hose and may optionally include the appropriate connector to which the hose may be attached. In one embodiment, the fill tube 12 and the drain pipe 14 are removable for shipping and storage purposes. The sealed connector 16 allows for easy installation of the fill tube and the drain tube 14 to the base 10 once the self-watering system 2 has been situated in the desired position (e.g., within a pot, planter box, etc.). For example, the sealed connector 16 may include a single injection molded unit affixed to the base 10 that allows for insertion of fill tube 12 or drain pipe 14. The sealed connector 16 may be flexible such that when fill tube 12 or drain pipe 14 is inserted, a liquid tight seal is formed without requiring any additional component parts.

In one embodiment, the base 10 of the self-watering system 2 includes a number of wick modules 18 arranged in a pattern for consistent distribution of water to the soil above the base 10. In one embodiment, there is a minimum of one wick module 18 per 18" of reservoir length in the base 10. The reservoir in the base 10 holds the water for distribution via the wick modules 18. The number and arrangement of wick modules 18 is situational and depends highly on both the growing conditions and the type of plants chosen. The configuration illustrated in FIG. 1, for example, may be used in general purpose vegetable garden beds that are optimized for performance over a temperature range of 0-120 degrees Fahrenheit and which are designed to be used across all seasons for typical edible garden plants. In one embodiment, this configuration includes wick modules 18 that are evenly distributed across each lengthwise base piece 30. In one embodiment, wick modules 18 are placed every 6-8 inches along the lengthwise base pieces 30 that form the outside edges of base 10 and every 12-16 inches along the lengthwise base pieces 30 that form the interior of base 10. In other embodiments, there may be some other arrangement of wick modules that is configurable based on an intended application of the self-watering system 2. For example, another configuration may be used such that there are approximately 1.2 to 2 wick modules 18 per square foot of top surface area of soil to be watered. For plants with higher water usage tolerances, additional configurations can be used. One example is trees and shrubs that have a more extensive root system. These plants will naturally balance to the amount of water available, allowing self-watering system 2 to include fewer wick modules 18 (e.g., 0.3 to 1 wick modules per square foot) for increased durability. Gardens in more moderate climates may only include an average ratio of one wick module 18 per square foot.

Figures 2A, 2B:
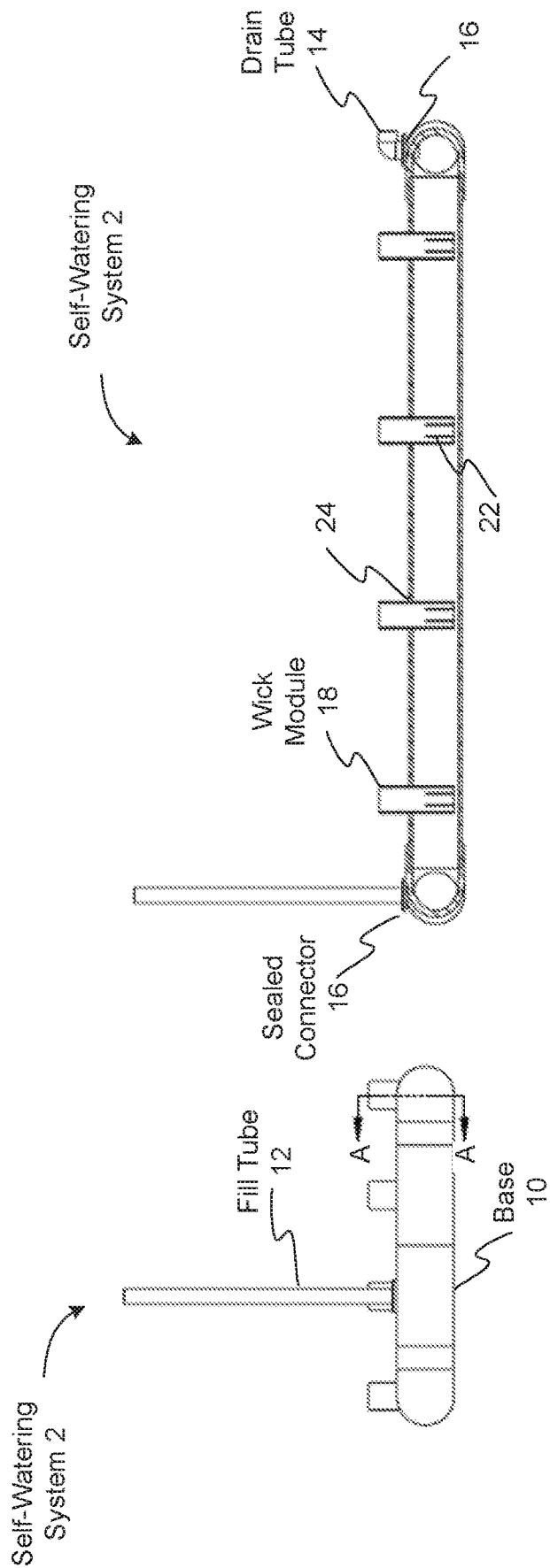
FIG. 2A illustrates a side view of the modular self-watering system, according to an embodiment of the present disclosure.
FIG. 2B illustrates a section view of the modular self-watering system, along plane A-A, as shown in FIG. 2A, according to an embodiment of the present disclosure.

FIG. 2A illustrates a side view of the modular self-watering system 2, according to an embodiment of the present disclosure. FIG. 2B illustrates a section view of the modular self-watering system 2, along plane A-A, as shown in FIG. 2A, according to an embodiment of the present disclosure. In FIG. 2B, a number of wick modules 18 can be seen along the length of base 10. In one embodiment, the wick modules 18 are permanently affixed to base 10 at junction 24 via welding and/or gluing in place for water tight seals. In one embodiment, each of the wick modules 18 include a number of flow cuts 22, as will be described in more detail below. As shown in FIG. 3A, each wick module 18 includes a solid housing which can be attached to base 10. In one embodiment, each wick module 18 extends through an outer surface of base 10 (e.g., through an outer surface of one of lengthwise base pieces 30), such that a lower portion of the wick module 18 is contained within the interior of the base 10, while an upper portion of the wick module 18 extends above the outer surface of base 10. In one embodiment, the flow cuts 22 are on the lower portion of the wick module 18 and are positioned within the interior of base 10 to allow water from the reservoir to flow into the wick module 18 and out into the soil surrounding the self-watering system 2.

FIG. 3A illustrates an isometric view of a wick module 18, according to an embodiment of the present disclosure. FIG. 3B illustrates a side view of the wick module 18, according to an embodiment of the present disclosure. FIG. 3C illustrates a section view of the wick module 18, along plane B-B, as shown in FIG. 3B, according to an embodiment of the present disclosure. As illustrated in FIGS. 3A and 3B, the solid housing of each wick module 18 includes a number of flow cuts 22. In one embodiment, the flow cuts are arranged in a pattern designed to allow water transfer from the reservoir to the internal wicking elements of the wick module 18. During filling of the reservoir, such as through fill tube 12, the flow cuts allow water to pass through and around the wick modules 18 which allows the reservoir to fill faster and without trapping pockets of air. During operation of the self-watering system 2, the flow cuts expose additional surface of the internal wicking elements to the water in the reservoir, which generates greater transfer efficiency of water through the wick module 18. In one embodiment, the solid housing of each wick module 18 includes a number of vertical flow cuts 22 that extend approximately 2.5-3 inches up from the bottom of the wick module 18. In one embodiment, there are 4-6 flow cuts 22 that are evenly distributed along the circumference of the wick module 18. These vertical flow cuts 22 allow for maximum water usage in certain situations, such as when the water level in the reservoir is below 20% of capacity. In one embodiment, the solid housing of each wick module 18 optionally includes one or more horizontal flow cuts (not shown) which allow for easier water transfer when the reservoir is full and for easier filling of the reservoir.

As shown in FIG. 3C, the internal wicking elements within each wick module 18 may include two or more layers of material, such as a durable material 26 and a fibrous material 28. In one embodiment, the durable material 26 forms a lower layer and the fibrous material 28 forms an upper layer within each wick module 18. The fibrous material 28 acts as an efficiency booster (i.e., an accelerant) for the wicking process as well as a way to keep the durable material 26 in place within the wick module 18 during shipping. The fibrous material 28 further prevents soil from entering the reservoir when self-watering system 2 is in operation. Both the durable material 26 and the fibrous material 28 can be chosen to last for a minimum of 3 years with no maintenance. After such an interval, the maintenance may include a process to clean and reuse the wicking materials or replace them for continued use at maximum watering efficiency.

In one embodiment, the lower layer of durable material 26 may occupy approximately 85-90% of the space within each wick module 18. The durable material 26 can include any number of possible materials, such as clay pebbles (hydroton), quartz, scoria igneous rocks, basalt, pelletized plastics, or other materials. Some non-natural alternative plastic materials that may be used include Polyethylene (PE), which resists concentrated acids, alkalis, and many organic solvents, allowing for a strong, tough, and lightweight wick, Polypropylene (PP), which resists most acids and alkalis and can be subjected to steam sterilization and combines resilience with resistance to fatigue, and Polytetrafluoroethylene (PTFE), which is chemically inert and thermally resistant, and can be subjected to steam and ethylene oxide (EtO) sterilization.

In one embodiment, the upper layer of fibrous material 28 may occupy approximately 10-15% of the space within each wick module 18. The fibrous material 28 can include any number of possible materials, such as coconut husk (coir), burlap, jute, hemp, wood bark/shavings, or other materials. In other embodiments, the fibrous material 28 may also be formed from any of the plastic materials used to form the durable material 26 as well. As shown in FIG. 3C, the internal wicking elements (i.e., durable material 26 and a fibrous material 28) within each wick module 18 function to draw water up 36 through a bottom opening of the wick module 18 and through the flow cuts 22 and disperse the water out 38 through a top opening of the wick module 18 and into the soil arranged on top of the self-watering system 2. For example, wick modules 18 may utilize a capillary action (sometimes referred to capillarity, capillary motion, the capillary effect, or simply "wicking") to disperse water from the reservoir. The capillary action is based on the ability of a liquid to flow in narrow spaces without the assistance of, or even in opposition to, external forces such as gravity. The capillary action is enhanced by the design of the wick modules 18 which include materials that allow for faster transfer of water, thus requiring lower pressure from the plant root systems.

The foregoing description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of embodiments of the present invention.

It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A self-watering system comprising:
    a base comprising a reservoir configured to store a defined volume of water;
    a plurality of wick modules coupled to the base, the plurality of wick modules arranged in an organized pattern and configured to disperse the water from the reservoir, wherein each of the plurality of wick modules comprises a solid housing at least partially filled with two or more layers of internal wicking elements, the two or more layers of internal wicking elements comprising a lower layer of durable material occupying a first portion of an interior of the solid housing and an upper layer of fibrous material occupying a second portion of the interior of the solid housing, and wherein the first portion is larger than the second portion;
    a removable fill tube coupled to the base and configured to receive the water to fill the reservoir; and
    a removable drain tube coupled to the base and configured to remove the water from the reservoir.

2. The self-watering system of claim 1, wherein the base is formed from a plurality of lengthwise base pieces coupled to a plurality of end base pieces.

3. The self-watering system of claim 2, wherein the plurality of lengthwise base pieces and the plurality of end base pieces comprise interconnected and hollow tubes that form the reservoir.

4. The self-watering system of claim 1, wherein the organized pattern of the plurality wick modules is configurable based on an intended application of the self-watering system.

5. The self-watering system of claim 1, wherein the organized pattern of the plurality wick modules comprises at least one wick module per 18 inches of a length of the base.

6. The self-watering system of claim 1, wherein the lower layer of durable material is formed from at least one of clay pebbles, quartz, scoria igneous rocks, basalt, or pelletized plastic.

7. The self-watering system of claim 1, wherein the upper layer of fibrous material is formed from at least one of coconut husk, burlap, jute, hemp, wood bark, or wood shavings.

8. The self-watering system of claim 1, wherein the solid housing of each of the plurality of wick modules comprises a plurality of flow cuts to enable flow of water from the reservoir into the corresponding wick module.

* * * * *